US012665898B2

(12) United States Patent
Segaert

(10) Patent No.: US 12,665,898 B2
(45) Date of Patent: Jun. 23, 2026

(54) AUTOMATED PASSWORD CHANGES FOR MULTIPLE SYSTEM USERS

(71) Applicant: Insight Direct USA, Inc., Chandler, AZ (US)

(72) Inventor: Jurgen M. Segaert, Phoenix, AZ (US)

(73) Assignee: Insight Direct USA, Inc., Chandler, AZ (US)

( * ) Notice: Subject to any disclaimer, the term of this patent is extended or adjusted under 35 U.S.C. 154(b) by 141 days.

(21) Appl. No.: 18/626,887

(22) Filed: Apr. 4, 2024

(65) Prior Publication Data

US 2024/0396887 A1     Nov. 28, 2024

Related U.S. Application Data

(60) Provisional application No. 63/457,888, filed on Apr. 7, 2023.

(51) Int. Cl.
H04L 9/40          (2022.01)

(52) U.S. Cl.
CPC ................................. H04L 63/083 (2013.01)

(58) Field of Classification Search
CPC .... H04L 63/083; H04L 63/0846; G06F 21/46
USPC .......................................................... 726/7
See application file for complete search history.

(56) References Cited

U.S. PATENT DOCUMENTS 5,611,048 A    3/1997  Jacobs et al.
5,719,941 A    2/1998  Swift et al.

| | | |
|---|---|---|
| 7,251,732 B2 | 7/2007 | Jamieson et al. |
| 8,677,464 B2 | 3/2014 | Smith et al. |
| 8,997,247 B2 * | 3/2015 | Nasu ..................... H04L 9/3273 |
| | | 726/27 |
| 9,652,606 B2 | 5/2017 | Cavanagh et al. |
| 9,785,766 B2 | 10/2017 | Leckey et al. |
| 10,162,961 B1 | 12/2018 | Shitrit et al. |
| 11,388,057 B1 | 7/2022 | Balar et al. |
| 11,489,729 B2 | 11/2022 | Brown et al. |
| 11,941,106 B2 * | 3/2024 | Chandrasekaran .......................... |
| | | H04L 63/0815 |
| 2005/0210267 A1 * | 9/2005 | Sugano ............... H04W 12/069 |
| | | 713/186 |

(Continued)

FOREIGN PATENT DOCUMENTS

| WO | 2013048504 A1 | 4/2013 |
|---|---|---|
| WO | 2014179386 A1 | 11/2014 |

*Primary Examiner* — Jahangir Kabir
(74) *Attorney, Agent, or Firm* — Kinney & Lange, P.A.

(57)          ABSTRACT

A system for changing a user's password across multiple servers accesses a master server within a multiple-server system architecture. The master server has a user database and a connection database. The system accesses a target server via a remote log in from the master server. The target server includes a user database and a connection database. The system changes an existing password within the user database of the target server. The system reads the connection database of the target database to determine which additional servers the target server connects to. The system updates the connection database of the target server with updated connection information. The system can alternatively receive a file upload containing information pertaining to which servers the target server can connect to, and subsequently update the connection database of the target server. This process is repeated for multiple servers and/or user accounts to perform mass password updates.

20 Claims, 4 Drawing Sheets

(56) References Cited

U.S. PATENT DOCUMENTS

| | | | | |
|---|---|---|---|---|
| 2012/0122424 | A1* | 5/2012 | Herscovici | H04L 63/162 |
| | | | | 455/411 |
| 2017/0011213 | A1* | 1/2017 | Cavanagh | H04L 67/02 |
| 2024/0031356 | A1* | 1/2024 | Jiang | H04L 63/083 |

* cited by examiner

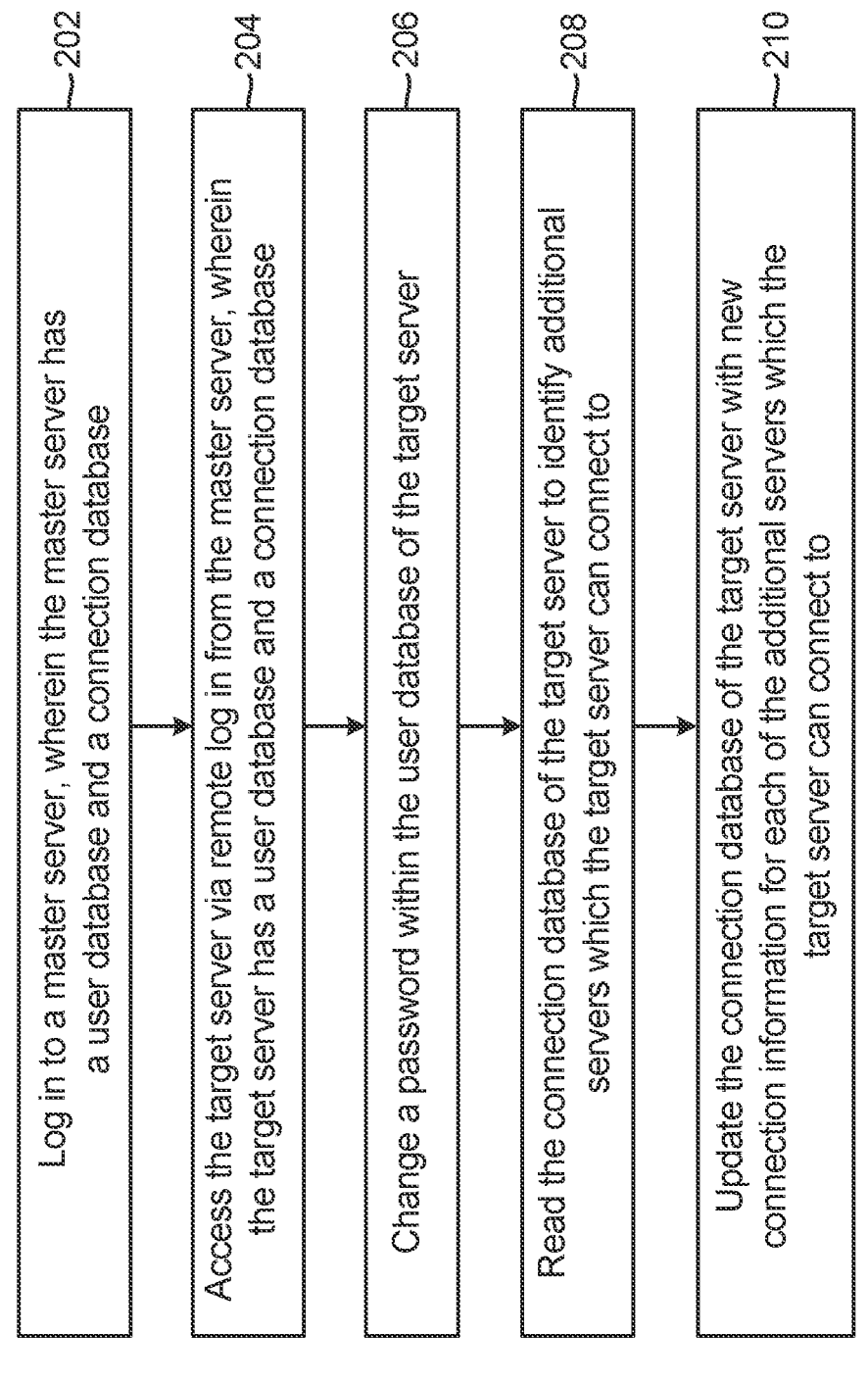

Log in to a master server, wherein the master server has a user database and a connection database — 202

Access the target server via remote log in from the master server, wherein the target server has a user database and a connection database — 204

Change a password within the user database of the target server — 206

Read the connection database of the target server to identify additional servers which the target server can connect to — 208

Update the connection database of the target server with new connection information for each of the additional servers which the target server can connect to — 210

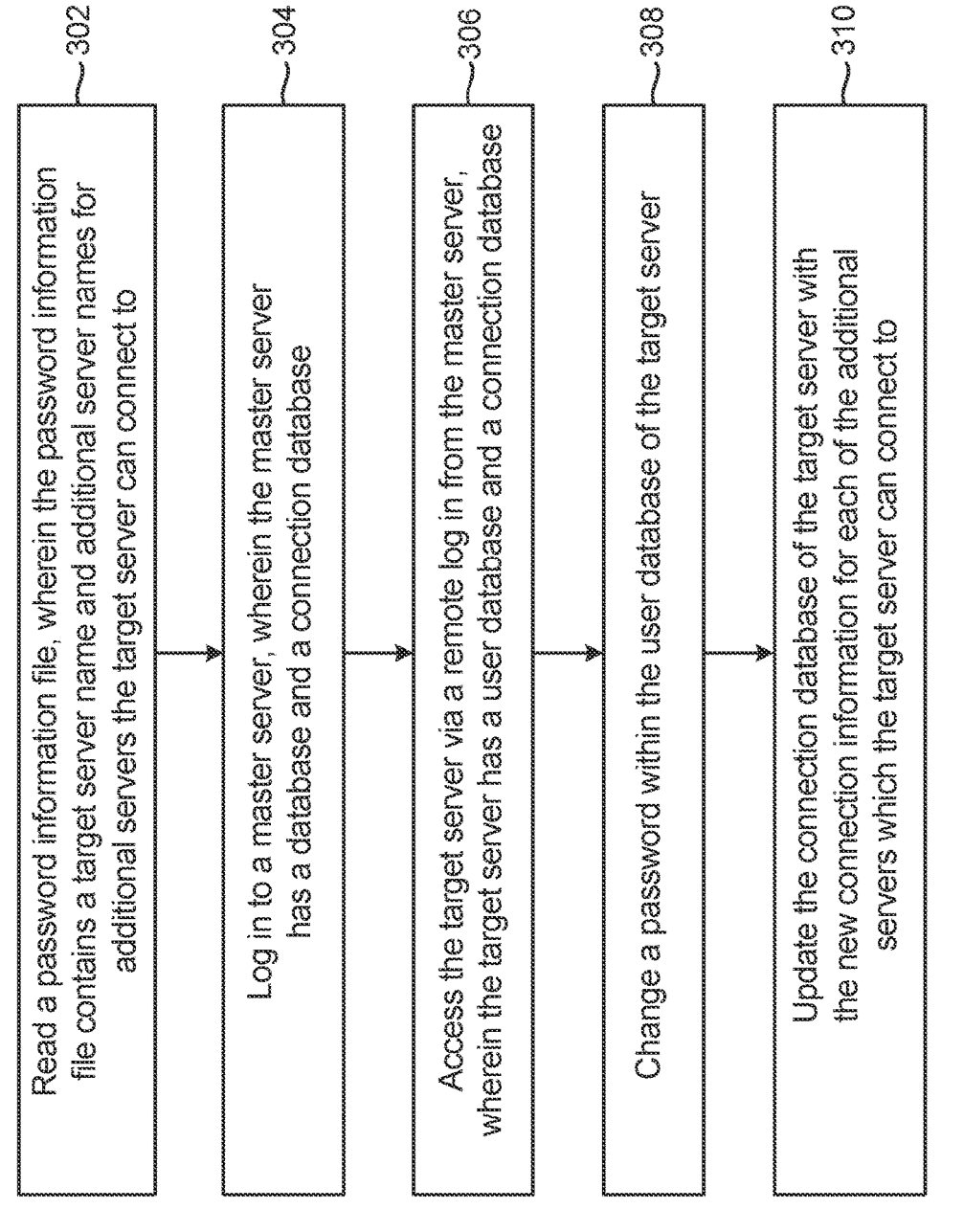

Read a password information file, wherein the password information file contains a target server name and additional server names for additional servers the target server can connect to — 302

Log in to a master server, wherein the master server has a database and a connection database — 304

Access the target server via a remote log in from the master server, wherein the target server has a user database and a connection database — 306

Change a password within the user database of the target server — 308

Update the connection database of the target server with the new connection information for each of the additional servers which the target server can connect to — 310

AUTOMATED PASSWORD CHANGES FOR MULTIPLE SYSTEM USERS

CROSS-REFERENCE TO RELATED APPLICATION

This application claims priority to U.S. Provisional Application No. 63/457,888, filed Apr. 7, 2023, and entitled "AUTOMATED PASSWORD CHANGES FOR MULTIPLE SYSTEM USERS," the disclosure of which is hereby incorporated by reference in its entirety.

BACKGROUND

Within a computing environment, a user may be required to access multiple servers. A user may access a first server through a remote log in via a second server. In case of a password change to the first server, both the first server and the second server may be required to know of the new password for the first server in order for the user to access the first server through the second server. In some examples, there can be any number of servers which are required to know of the password change. With the increasing complexity of a high number of servers, it is desirable for a system to be able to automate the password change process for users requiring access to many different servers.

SUMMARY

A system for changing a user's password across multiple servers uses a processor and computer-readable memory to perform the following steps. The system logs in to a master server that includes a user database and a connection database. The system accesses a target server via a remote log in from the master server. The system changes an existing password within a user database of the target server to a new password. The system reads the connection database of the target server to identify additional servers to which the target server connects. The system updates the connection database of the target server with a set of new connection information for each of the additional servers to which the target server connects, such that the set of connection information for each of the additional servers to which the target server connects are updated concurrently.

A system for changing a user's password across multiple servers uses a processor and computer-readable memory to perform the following steps. The system logs in to a master server that includes a user database and a connection database. The system reads a password information file, which includes a target server name and additional server names for additional servers to which the target server connects. The system logs in to a master server. The system accesses a target server via a remote log in from the master server. The system changes an existing password within a user database of the target server to a new password. The system updates the connection database of the target server with a set of new connection information for each of the additional servers to which the target server connects, such that the set of connection information for each of the additional servers to which the target server connects are updated concurrently.

BRIEF DESCRIPTION OF THE DRAWINGS

FIG. 2 is a method flowchart of an embodiment of steps taken by the system to automatically change passwords for multiple system users.
FIG. 3 is a method flowchart of another embodiment of steps taken by the system to automatically change passwords for multiple system users.

DETAILED DESCRIPTION

A user can have access to multiple servers within a system. According to the techniques of this disclosure, such a user can undergo an automatic password change for a target server as well as all other connected servers which access the target server. The techniques of this disclosure provide the benefit of coordinating the password change across the plurality of servers and/or user accounts such that the user can access the target server with the new password from any other connected server. The user does not then have to manually access each connected server and update the password information to connect to the target server from each of the connected servers.

Figure 1A:
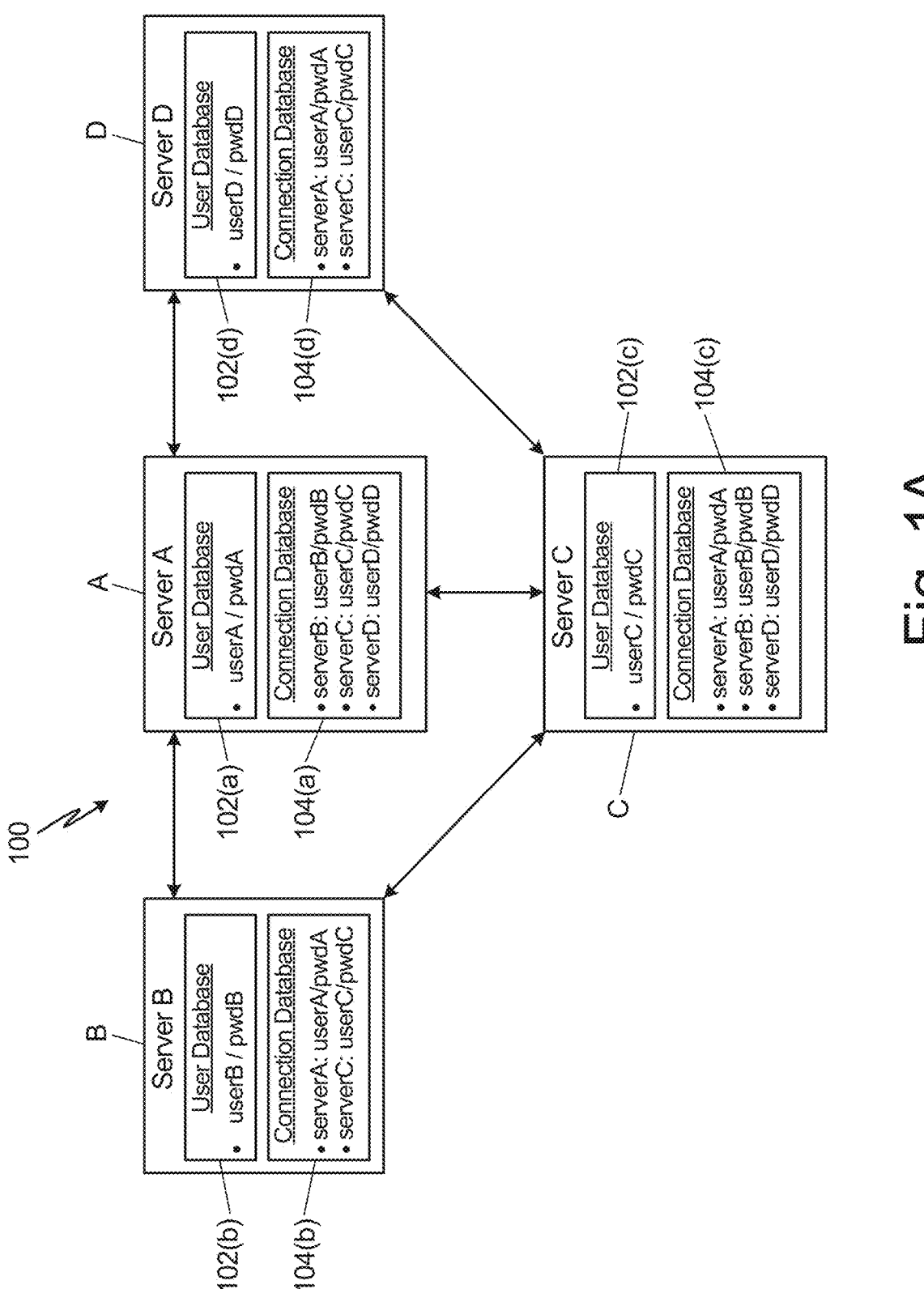
FIG. 1A is a diagram of an example embodiment of a system architecture for multiple servers.

FIG. 1A is a diagram of an example embodiment of system architecture 100 for multiple servers. System architecture 100 includes master server A, server B, server C, and server D. Master server A includes user database 102 (a) and connection database 104 (a). Server B includes user database 102 (b) and connection database 104 (b). Server C includes user database 102 (c) and connection database 104 (c). Server D includes user database 102 (d) and connection database 104 (d).

System architecture 100 includes connections between the plurality of servers. In the example depicted, server A is connected to server B, server C, and server D. Thus, master server A is connected to all other servers within system architecture 100. Server B is connected to master server A and server C. Server C is connected to master server A, server B, and server D. Server D is connected to master server A and server C. There is no connection between server B and server D.

Each server in system architecture 100 contains a user database in which the username and password required to log in to the server is stored. For example, in master server A, user database 102 (a) contains username "userA" and password "pwdA". The credentials "userA" and "pwdA" are used to access master server A. For server B, the credentials "userB" and "pwdB" stored in user database 102 (b) are used to log in to server B. For server C, the credentials "userC" and "pwdC" stored in user database 102 (c) are used to log in to server C. For server D, the credentials "userD" and "pwdD" stored in user database 102 (d) are used to log in to server D.

Each server in system architecture 100 also contains a connection database in which usernames and passwords required to access other systems within system architecture are stored. For example, as described above with respect system architecture 100, master server A is connected to all other servers in system architecture 100. Thus, connection database 104 (a) of master server A includes credentials to log in to all other servers within system architecture 100. These credentials include "userB" and "pwdB" to log in to server B, "userC" and "pwdC" to log in to server C, and "userD" and "pwdD" to log in to server D. Conversely, server D would not include log in information to every other server in system architecture 100 because server D is not connected to server B. Thus, connection database 104(d) of server D 108 would include the credentials "userA" and "pwdA" to log in to master server A and "userC" and "pwdC" to log in to server C.

In the case of a password change, the information for accessing a target server in the target server's user database must be changed. Thus, for example, a password change for accessing master server A from "pwdA" to "newpassA" would require updating user database 102 (*a*) to include "userA" and "newpassA". A password change for accessing server B would require updating user database 102 (*b*) with the new password information. A password change for accessing server C would require updating user database 102 (*c*) with the new password information. A password change for accessing server D would require updating user database 102 (*d*) with the new password information.

As the various servers depicted in system architecture 100 are interconnected, each connecting server can require an update to its connection database in order to access a connected server which has undergone a password change. Thus, for example, if server B has undergone a password change, user database 102 (*b*) of server B would be updated to include "userB" and "newpassB". For server C to connect to server B, the connection database 104 (*c*) of server C must be updated to include the new password information from user database 102 (*b*) of server B. Thus, connection database 104 (*c*) of server C which previously included "server B: userB/pwdB" would be updated to include "server B: userB/newpassB", to reflect the password change of server B. The update allows server C to access server B with the new password credentials.

According to the techniques of this disclosure, a password change to the user database of a server within system architecture 100 can be an automatic process in which a target server's user database is updated with new password information, and each server with a connection database containing a connection to the target server is automatically updated. Methods for such an automated process are described below in the description of FIGS. 2 and 3.

The techniques of this disclosure are not limited to the embodiment of system architecture 100 depicted in FIG. 1. In some embodiments, there can be any number of servers in a connected environment. Further, any combination of connections between servers can be used. Additionally, the separation of databases within each individual server into a user database and a connection database can be altered in different embodiments. For example, in some embodiments, the user database and the connection database are a singular database. Further, the information contained within the user database and the connection database of a server may be stored in various formats. In the illustrated embodiment, the information in the user database and the connection database is a plaintext username and password. In other embodiments, the plain text is encrypted to protect the information contained within the databases. In still other embodiments, the information within the user database and the connection database is stored as a hash, such that a hashing algorithm is required to decode the password. Other embodiments for secure password storage within the database can also be used.

Figure 1B:
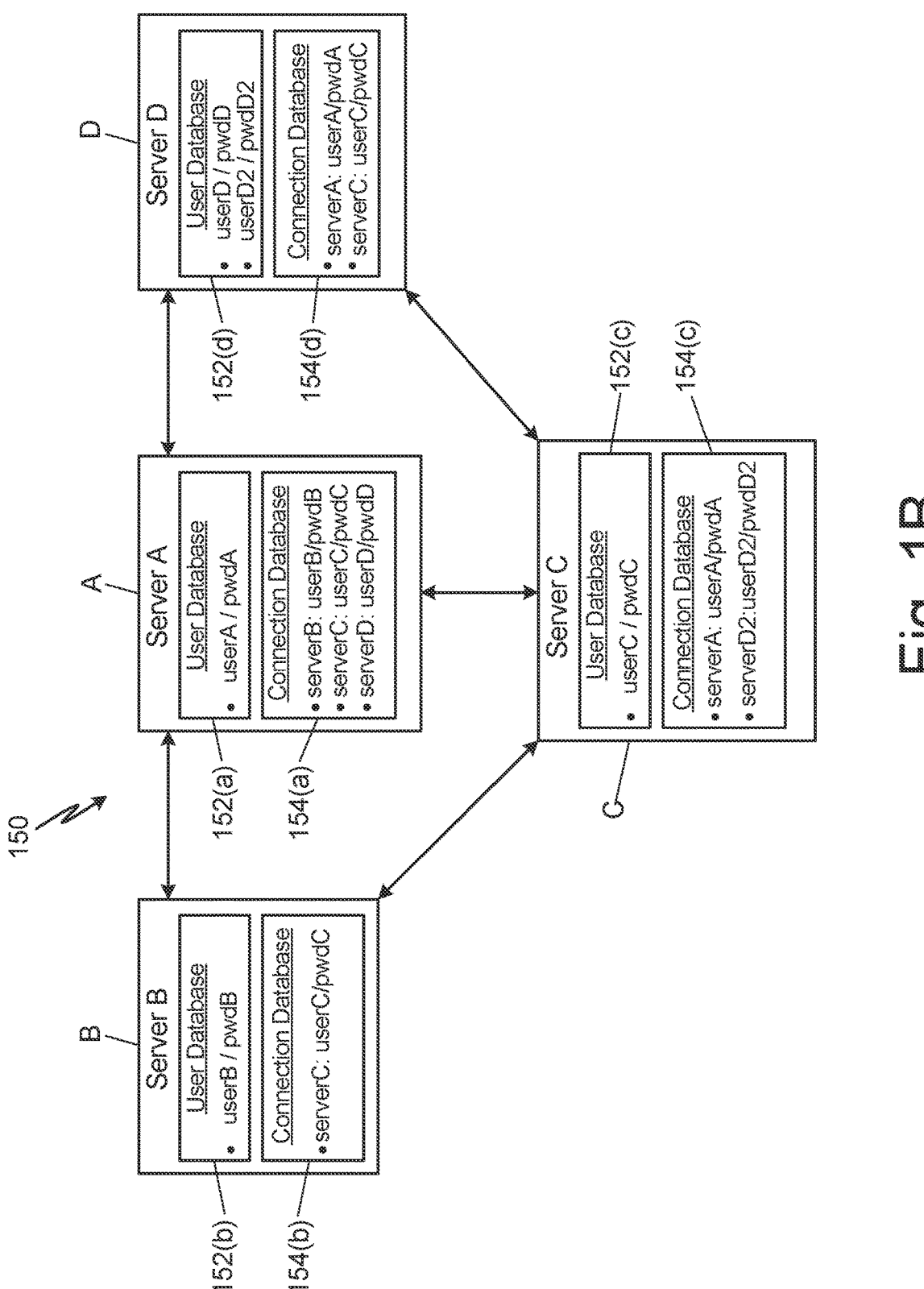
FIG. 1B is a diagram of another example embodiment of a system architecture for multiple servers.

FIG. 1B is a diagram of an additional example embodiment of system architecture 150 for multiple servers. System architecture 150 includes master server A, server B, server C, and server D. Master server A includes user database 152 (*a*) and connection database 154 (*a*). Server B includes user database 152 (*b*) and connection database 154 (*b*). Server C includes user database 152 (*c*) and connection database 154 (*c*). Server D includes user database 152 (*d*) and connection database 154 (*d*).

System architecture 150 includes connections between the plurality of servers. The embodiment of system architecture 150 differs from the embodiment of system architecture 100 in that some connections are unidirectional, while others are bidirectional. The directionality of the servers will be discussed in greater detail below. In the example depicted, server A is connected to server B, server C, and server D. Thus, master server A is connected to all other servers within system architecture 150. Server B is connected to master server A and server C. Server C is connected to master server A, server B, and server D. Server D is connected to master server A and server C. There is no connection between server B and server D.

Each server in system architecture 150 contains a user database in which the username and password required to log in to the server is stored. The embodiment of system architecture 150 differs from the embodiment of system architecture 100 in that a user database can have more than one set of credentials to access a target server. Thus, for example, server D has user database 152 (*d*) having first set of credentials "userD" and "pwdD" and second set of credentials "userD2" and "pwdD2". Both the first set of credentials and the second set of credentials can be used to access server D.

Each server in system architecture 150 also contains a connection database in which usernames and passwords required to access other systems within system architecture 150 are stored. The embodiment of system architecture 150 differs from the embodiment of system architecture 100 in that the connection database of each server can give rise to a unidirectional relationship, bidirectional relationship, or no relationship with other servers. For example, connection database 154 (*b*) of server B contains credentials to access server C, while connection database 154 (*c*) of server C does not contain credentials to access server B. Thus, the relationship between server B and server C is depicted as unidirectional, wherein server B has access to server C. Conversely, with respect to server D and server A, the relationship is bidirectional. Thus, connection database 154 (*d*) of server D contains credentials to access server A, and connection database 154 (*a*) of master server A contains credentials to access server D. Thus, the relationship between server A and server D is bidirectional. Server B does not contain any access credentials for server D and likewise, server D does not contain any login credentials for server B. Thus, there is no relationship between server B and server D.

In the embodiment of system architecture 150, a connection database can contain credentials to access a target server that differ from credentials of another connection database that can access the same target server. For example, connection database 154 (*a*) of server A contains a first set of credentials to access server D, wherein the first set of credentials are "userD" and "pwdD". Connection database 154 (*c*) of server C contains a second set of credentials to access server D, wherein the second set of credentials are "userD2" and "pwdD2". Both the first set of credentials and the second set of credentials are contained within user database 152 (*d*) of server D, and thus both the first set of credentials and the second set of credentials can be used to access server D.

In some embodiments, different log in credentials can result in different access capabilities to the target server. For example, the first set of credentials "userD" and "pwdD" can provide a greater level of access to server D, whereas the second set of credentials "userD2" and "pwdD2" can provide a more restricted level of access. Such an application can be useful in differentiating between various users of a target server, wherein one user has, for example, administrator level access, while another user has, for example, limited user level access. Thus, remote access from server A to server D, which uses first set of credentials, can result in greater access to server D, whereas remote access from server C to server D, which uses second set of credentials, can result in more restricted access to server D. The first set of credentials and the second set of credentials with a first level of access and a second level of access are merely intended to be portrayed as examples, and it is understood that there can be any number of credential sets and any number of access levels assigned to such credential sets for accessing a target server.

In the case of a password change, the information for accessing a target server in the target server's user database must be changed. For example, a password change for accessing server D would require updating user database 152 (*d*) with the new password information. In some embodiments, both the first set of credentials and the second set of credentials within user database 152 (*d*) are updated. In other embodiments, only one set of credentials is updated. Correspondingly, the connection database of the connecting databases must be updated. For example, connection database 154 (*a*) of server A and connection database 154 (*c*) of server C must be updated with the new credentials. In some embodiments, only the first set of credentials is updated. In such an embodiment, only connection database 152 (*a*) of server A is updated to reflect the change. In another embodiment, only the second set of credentials is updated. In such an embodiment, only connection database 152 (*c*) of server C is updated to reflect the change. In still other embodiments, both the first set of credentials and the second set of credentials are updated. In such an embodiment, both connection database 152 (*a*) and connection database 152 (*c*) are updated to reflect the changes to the first set of credentials and the second set of credentials respectively.

According to the techniques of this disclosure, a password change to the user database of a server within system architecture 150 can be an automatic process in which a target server's user database is updated with new password information, and each server with a connection database containing a connection to the target server is automatically updated. Methods for such an automated process are described below in the description of FIGS. 2 and 3.

The automated password change technique within system architecture 100 and system architecture 150 provides the advantage of eliminating the manual effort of updating every connection database for a server connected to a target server in which a change has been made to the user database. This automation reduces the possibility that a connected server may not be changed to reflect an update to the user database of a target server due to oversight. Additionally, this automation provides the benefit of timely password changes where some systems may lock users out after a specified time has elapsed with an incorrect password stored in the connection database.

FIG. 2 depicts method 200, which is a method of steps taken by a system to automatically change passwords for multiple system users. A system for executing the steps of method 200 can include a processor and computer readable memory, wherein the processor can execute the method instructions stored in the computer readable memory. Method 200 will be described with reference to system architecture 100 of FIG. 1 for illustrative purposes.

Method 200 begins at step 202, in which a system for automatic password changes logs in to a master server. The master server is, for example, master server A of system architecture 100. Master server A has a user database and a connection database. Master server A is connected to all other servers within system architecture 100 including server B, server C, and server D.

At step 204, the system accesses a target server via a remote log in from the master server. The target server has a user database and a connection database. The target server is the server in which the password change is to be made. For example, master server A is used to remotely log in to server B, provided that the password change is to be made within server B.

In some embodiments, the target server is the same as the master server. In such an embodiment, step 204 is bypassed as the system is already logged in to the target server. The system can proceed to step 206.

At step 206, the system changes a password within the user database of the target server. For example, the password contained within user database 102 (*b*) of server B can be changed from "pwdB" to "newpassB" by the system. The password is a plaintext password, and encrypted password, or a hash such that a hashing algorithm is required to decode the password. Other embodiments for secure password storage within the user database can also be used. In some embodiments, the password is provided to the system prior to initiation of the method 200. In other embodiments, the system generates a randomized password for use in the user database of the target server.

At step 208, the system reads the connection database of the target server to identify additional servers to which the target server can connect. For example, the system reads connection database 104 (*b*) of server B to identify that server B can connect to master server A and server C.

At step 210, the system updates the connection database of the target server with new connection information for each of the additional servers to which the target server can connect. For example, if the connection database 104 (*b*) of server B can be updated with new connection information for server A and server C, if the connection information needs to be updated. If the connection information for both server A and server C needs to be updated, connection database 104 (*b*) can update the connection information for server A from "pwdA" to "newpassA" and the connection information for server C from "pwdC" to "newpassC". In other examples, only server A or server C require updated connection information. In still other examples, the system can recognize that neither server A nor server C require updated connection information.

Method 200 is repeated from steps 204-210 for each additional server in which a password update is required or for which connection information needs to be updated. Thus, the target server can be server A in the first iteration, server B in the second iteration, server C in the third iteration, and server D in the fourth iteration. There can be any number of servers in the system. In some embodiments, the password update is done across various servers simultaneously. Thus, the system can access multiple servers at the same time and perform concurrent password updates.

In some embodiments, method 200 further includes the step of performing a password check to ensure that the new password meets a set of password criteria. The password check is performed prior to saving the password in the user database of the target server. Thus, for example, the system evaluates the password to be saved in user database 102 (*b*) of server B to ensure that the password fulfills the password criteria. The new password "newpassB" is accepted as a new password if it fulfills the password criteria, or is rejected if it does not fulfill the password criteria. Examples of password criteria can include, but are not limited to, a capital letter requirement, a numerical character requirement, and/or a restriction or requirement of special characters.

FIG. 3 depicts method 300, which is an additional embodiment of a method of steps taken by a system to automatically change passwords for multiple system users. A system for executing the steps of method 300 includes a processor and computer readable memory, wherein the processor can execute the method instructions stored in the computer readable memory. Method 300 will be described with reference to system architecture 100 of FIG. 1 for illustrative purposes.

Method 300 begins at step 302, in which the system reads a password information file. The password information file contains a target server name and additional server names for the additional servers the target server can connect to. The password information file also contains the username and password to be stored in the user database of the target server. Table 1 contains information that is present in an example password information file.

TABLE 1

| Target Server | Additional Server | Username | Password |
|---|---|---|---|
| Server B | Server B (user database) | UserB | newpassB |
| Server B | Server A | UserA | newpassA |
| Server B | Server C | UserC | newpassC |

Table 1 represents an example password change, in which the target server is server B, and the additional connected servers include server A and server C. Table 1 contains new username and password information for server B to be saved in user database 102 (*b*) of server B. Table 1 also contains new username and password information for the servers to which server B can connect. In the depicted example of Table 1, the file contains the new username and password information for server A and server C to be saved in connection database 104 (*b*) of server B.

At step 304, the system logs in to a master server. The master server includes a user database and a connection database. The master server is connected to all other servers within a network. The master server is, for example, master server A of system architecture 100 or master server A of system architecture 150.

At step 306, the system accesses the target server via a remote log in from the master server. The target server includes a user database and a connection database. The target server is the server in which the password change will be made.

At step 308, the system changes a password within the user database of the target server. At step 310, the system updates a set of connection information contained within the connection database of the target server. Thus, at the end of step 310, the new password for the target server is changed in the user database of the target server and the target server contains updated connection information for each server to which the target server can connect.

Method 300 is repeated from steps 302-310 for each additional server in which a password update is required or for which connection information needs to be updated. In some embodiments, the password information file is comprehensive in that it contains information regarding a first target server, a second target server, a third target server, etc., such that method 300 need only be repeated from steps

304-310. In such an embodiment, only one password information file is read by the system.

In method 300 the target server can be server A in the first iteration, server B in the second iteration, server C in the third iteration, and server D in the fourth iteration. There can be any number of servers in the system. In some embodiments, the password update is done across various servers simultaneously. Thus, the system can access multiple servers at the same time and perform concurrent password updates and connection information updates.

In some embodiments, method 300 further includes the step of performing a password check to ensure that the new password meets a set of password criteria. The password check is performed prior to saving the password in the user database of the target server. The new password is accepted as a new password if it fulfills the password criteria, or is rejected if it does not fulfill the password criteria.

As described with respect to FIGS. 2 and 3, a system for executing the steps of method 200 and/or method 300 includes a processor and computer readable memory, wherein the processor executes the method instructions stored in the computer readable memory. Examples of the processor include any one or more of a microprocessor, a controller, a digital signal processor (DSP), an application specific integrated circuit (ASIC), a field-programmable gate array (FPGA), or other equivalent discrete or integrated logic circuitry.

The computer-readable memory is configured to store information during the execution of method 200 or method 300. The computer-readable memory, in some examples, is described as computer-readable storage media. In some examples, a computer-readable storage medium includes a non-transitory medium. The term "non-transitory" indicates that the storage medium is not embodied in a carrier wave or a propagated signal. In certain examples, a non-transitory storage medium stores data that, over time, changes (e.g., in RAM or cache). In some examples, the computer-readable memory is a temporary memory, meaning that a primary purpose of the computer-readable memory is not long-term storage. The computer-readable memory, in some examples, is described as volatile memory, meaning that the computer-readable memory does not maintain stored contents when electrical power to computer-readable memory is removed. Examples of volatile memories can include random access memories (RAM), dynamic random access memories (DRAM), static random access memories (SRAM), and other forms of volatile memories. In some examples, computer-readable memory is used to store program instructions for execution by the processor. Computer-readable memory, in one example, is used by software or applications to temporarily store information during program execution.

The computer-readable memory, in some examples, also includes one or more computer-readable storage media. The computer-readable memory is configured to store larger amounts of information than volatile memory. The computer-readable memory is further configured for long-term storage of information. In some examples, computer-readable memory includes non-volatile storage elements. Examples of such non-volatile storage elements include, but are not limited to, magnetic hard discs, optical discs, flash memories, or forms of electrically programmable memories (EPROM) or electrically erasable and programmable (EEPROM) memories.

The system described with reference to the methods of FIGS. 2 and 3 provides the advantage of automating the process of password changes for interconnected servers within a system. The automation reduces the likelihood that one of the additional servers does not receive the password change information in its respective connection database, resulting in a user being unable to access the target server from the additional server. Further, with the techniques of this disclosure, the password change can be done timely before a system account is locked out by attempting to log in to a target server with incorrect credentials. The techniques of this disclosure can be used to perform periodic automatic mass password changes to servers and to user accounts therein. Such an application is advantageous in ensuring maintenance of security across systems and ensuring efficiency in updating username and password information.

Discussion of Possible Embodiments

The following are non-exclusive descriptions of possible embodiments of the present invention.

A system for changing a user's password across multiple servers uses a processor and computer-readable memory to perform the following steps. The system logs in to a master server that includes a user database and a connection database. The system accesses a target server via a remote log in from the master server. The system changes an existing password within a user database of the target server to a new password. The system reads the connection database of the target server to identify additional servers to which the target server connects. The system updates the connection database of the target server with a set of new connection information for each of the additional servers to which the target server connects, such that the set of connection information for each of the additional servers to which the target server connects to are updated concurrently.

The system of the preceding paragraph can optionally include, additionally and/or alternatively, any one or more of the following features, configurations and/or additional components.

In a further embodiment, the user database for the master server contains a username and a password for accessing the master server.

In a further embodiment, the user database for the target server contains a username and a password for accessing the target server.

In a further embodiment, the connection database of the master server contains a plurality of usernames and corresponding passwords for all servers in the system.

In a further embodiment, the master server is capable of remotely logging in to all servers in the system.

In a further embodiment, the target server is unidirectionally connected to one or more of the additional servers, such that the target server can access one or more of the additional servers while the one or more additional servers cannot access the target server.

In a further embodiment, each of the additional servers contains a user database and a connection database.

In a further embodiment, the password connection information to connect from each of the additional servers to the target server is stored in the connection database within each of the additional servers.

In a further embodiment, a connection database of a first server of the additional servers contains a first set of password connection information to connect to the target server and a connection database of a second server of the additional servers contains a second set of password connection information to connect to the target server, wherein the first set of password connection information and the second set of password connection information provide different levels of access to the target server.

In a further embodiment, the computer-readable memory is further encoded with instructions that, when executed by the one or more processors, cause the system to perform a password check to ensure that the new password meets a set of password criteria.

A system for changing a user's password across multiple servers uses a processor and computer-readable memory to perform the following steps. The system logs in to a master server that includes a user database and a connection database. The system reads a password information file, which includes a target server name and additional server names for additional servers to which the target server connects. The system logs in to a master server. The system accesses a target server via a remote log in from the master server. The system changes an existing password within a user database of the target server to a new password. The system updates the connection database of the target server with a set of new connection information for each of the additional servers to which the target server connects, such that the set of connection information for each of the additional servers to which the target server connects are updated concurrently.

The system of the preceding paragraph can optionally include, additionally and/or alternatively, any one or more of the following features, configurations and/or additional components.

In a further embodiment, the user database for the master server contains a username and a password for accessing the master server.

In a further embodiment, the user database for the target server contains a username and a password for accessing the target server.

In a further embodiment, the connection database of the master server contains a plurality of usernames and corresponding passwords for all servers in the system.

In a further embodiment, the master server is capable of remotely logging in to all servers in the system.

In a further embodiment, the target server is unidirectionally connected to one or more of the additional servers, such that the target server can access the one or more additional servers while the one or more additional servers cannot access the target server.

In a further embodiment, each of the additional servers contains a user database and a connection database.

In a further embodiment, the password connection information to connect from each of the additional servers to the target server is stored in the connection database within each of the additional servers.

In a further embodiment, a connection database of a first server of the additional servers contains a first set of password connection information to connect to the target server and a connection database of a second server of the additional servers contains a second set of password connection information to connect to the target server, wherein the first set of password connection information and the second set of password connection information provide different levels of access to the target server.

In a further embodiment, the computer-readable memory is further encoded with instructions that, when executed by the one or more processors, cause the system to perform a password check to ensure that the new password meets a set of password criteria.

The invention claimed is:

1. A system for changing a password across multiple servers for a user, the system comprising:

a processor; and computer-readable memory encoded with instructions that, when executed by the one or more processors, cause the system to:

log in to a master server, wherein the master server has a user database and a connection database;

access a target server via a remote log in from the master server, wherein the target server includes a user database and a connection database;

change an existing password within the user database of the target server to a new password;

read the connection database of the target server to identify additional servers to which the target server connects; and update the connection database of the target server with a set of new connection information for each of the additional servers to which the target server connects, such that the set of connection information for each of the additional servers to which the target server connects to are updated concurrently;

wherein each of the additional servers includes a user database and a connection database, the connection database of each of the additional servers containing connection information for at least two of the master server, the target server, or another one of the additional servers.

2. The system of claim 1, wherein the user database for the master server contains a username and a password for accessing the master server.

3. The system of claim 1, wherein the user database for the target server contains a username and a password for accessing the target server.

4. The system of claim 1, wherein the connection database of the master server contains a plurality of usernames and corresponding passwords for all servers in the system.

5. The system of claim 4, wherein the master server is capable of remote login to all servers in the system.

6. The system of claim 1, wherein the target server is unidirectionally connected to one or more of the additional servers, such that the target server can access one or more of the additional servers while the one or more additional servers cannot access the target server.

7. The system of claim 1, wherein each of the additional servers includes a user database and a connection database.

8. The system of claim 7, wherein the password connection information to connect from each of the additional servers to the target server is stored in the connection database within each of the additional servers.

9. The system of claim 8, wherein a connection database of a first server of the additional servers contains a first set of password connection information to connect to the target server and a connection database of a second server of the additional servers contains a second set of password connection information to connect to the target server, wherein the first set of password connection information and the second set of password connection information provide different levels of access to the target server.

10. The system of claim 1, wherein the computer-readable memory is further encoded with instructions that, when executed by the one or more processors, cause the system to:

perform a password check to ensure that the new password meets a set of password criteria.

11. A system for changing a password across multiple servers for a user, the system comprising:

a processor; and computer-readable memory encoded with instructions that, when executed by the one or more processors, cause the system to:

read a password information file, wherein the password information file contains a target server name and additional server names for additional servers to which the target server connects;

log in to a master server, wherein the master server includes a user database and a connection database;

access the target server via a remote log in from the master server, wherein the target server includes a user database and a connection database;

change an existing password within the user database of the target server to a new password; and update the connection database of the target server with a set of new connection information for each of the additional servers to which the target server connects, such that the set of connection information for each of the additional servers to which the target server connects are updated concurrently;

wherein each of the additional servers includes a user database and a connection database, the connection database of each of the additional servers containing connection information for at least two of the master server, the target server, or another one of the additional servers.

12. The system of claim 11, wherein the user database for the master server contains a username and a password for accessing the master server.

13. The system of claim 11, wherein the user database for the target server contains a username and a password for accessing the target server.

14. The system of claim 11, wherein the connection database of the master server contains a plurality of usernames and corresponding passwords for all servers in the system.

15. The system of claim 14, wherein the master server is capable of remote login to all servers in the system.

16. The system of claim 11, wherein the target server is unidirectionally connected to one or more of the additional servers, such that the target server can access the one or more additional servers while the one or more additional servers cannot access the target server.

17. The system of claim 11, wherein each of the additional servers includes a user database and a connection database.

18. The system of claim 17, wherein the password connection information to connect from each of the additional servers to the target server is stored in the connection database within each of the additional servers.

19. The system of claim 18, wherein a connection database of a first server of the additional servers contains a first set of password connection information to connect to the target server and a connection database of a second server of the additional servers contains a second set of password connection information to connect to the target server, wherein the first set of password connection information and the second set of password connection information provide different levels of access to the target server.

20. The system of claim 11, wherein the computer-readable memory is further encoded with instructions that, when executed by the one or more processors, cause the system to:

perform a password check to ensure that the new password meets a set of password criteria.

* * * * *